(12) United States Patent
Chang et al.

(10) Patent No.: US 10,557,616 B1
(45) Date of Patent: Feb. 11, 2020

(54) ELECTRONIC DEVICE

(71) Applicant: QISDA CORPORATION, Taoyuan (TW)

(72) Inventors: Yung-Yeh Chang, Taoyuan (TW); Ting-Hui Chih, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/409,878

(22) Filed: May 13, 2019

(30) Foreign Application Priority Data

Jan. 30, 2019 (TW) .............................. 108103565 A

(51) Int. Cl.
| | |
|---|---|
| *F21V 14/00* | (2018.01) |
| *F21V 8/00* | (2006.01) |
| *G06F 1/16* | (2006.01) |
| *F21W 121/00* | (2006.01) |
| *G09F 13/00* | (2006.01) |

(52) U.S. Cl.
CPC .......... *F21V 14/006* (2013.01); *G02B 6/0088* (2013.01); *G06F 1/1601* (2013.01); *F21W 2121/00* (2013.01); *G09F 13/00* (2013.01)

(58) Field of Classification Search
None
See application file for complete search history.

(56) References Cited

U.S. PATENT DOCUMENTS

| | | | | |
|---|---|---|---|---|
| 3,755,664 | A * | 8/1973 | Reiback .................. | G09F 13/00 40/433 |
| 8,638,549 | B2 * | 1/2014 | Garelli ................... | G06F 1/1615 361/679.26 |
| 9,229,482 | B2 * | 1/2016 | Cheng .................... | G06F 1/1656 |
| 2002/0190975 | A1* | 12/2002 | Kerr .......................... | G06F 1/16 345/211 |
| 2004/0156192 | A1* | 8/2004 | Kerr ....................... | G06F 1/1601 362/154 |
| 2004/0212983 | A1* | 10/2004 | Yang .................... | G02B 6/0063 362/604 |
| 2006/0256037 | A1* | 11/2006 | Kerr ........................ | G06F 1/181 345/30 |
| 2008/0074833 | A1* | 3/2008 | Chien ................... | G06F 1/1601 361/679.4 |
| 2008/0074834 | A1* | 3/2008 | Chien ................... | G06F 1/1601 361/679.55 |
| 2009/0196032 | A1* | 8/2009 | Hsu .......................... | G09F 13/14 362/231 |
| 2018/0042417 | A1* | 2/2018 | Brown ............... | A47G 19/2227 |

FOREIGN PATENT DOCUMENTS

| | | |
|---|---|---|
| CN | 201282600 Y | 7/2009 |
| TW | 201627964 A | 8/2016 |

\* cited by examiner

*Primary Examiner* — Alexander K Garlen

(57) ABSTRACT

An electronic device includes a light transmissive casing and a light emitting module. The light emitting module is disposed on the light transmissive casing. The light emitting module includes a frame, a light source and a pattern member. The light source is disposed in the frame. The frame is connected to the light transmissive casing. The pattern member is sandwiched in between the frame and the light transmissive casing. The pattern member has at least one light transmissive pattern region. A light emitted by the light source passes through the at least one light transmissive pattern region to be projected out of the light transmissive casing, so as to form a pattern corresponding to the at least one light transmissive pattern region.

11 Claims, 16 Drawing Sheets

ELECTRONIC DEVICE

BACKGROUND OF THE INVENTION

1. Field of the Invention

The invention relates to an electronic device and, more particularly, to an electronic device capable of projecting a pattern out of a light transmissive casing.

2. Description of the Prior Art

As technology advances and develops, various electronic devices are considered a necessity by a lot of people in their daily lives. When a consumer purchases an electronic device, the appearance is also a major consideration in addition to function. For further illustration, when two electronic devices have identical or similar function, the consumer usually purchases the electronic device with more attractive appearance. Therefore, how to improve the appearance of the electronic device has become a significant design issue.

SUMMARY OF THE INVENTION

An objective of the invention is to provide an electronic device capable of projecting a pattern out of a light transmissive casing, so as to solve the aforesaid problems.

According to an embodiment of the invention, an electronic device comprises a light transmissive casing and a light emitting module. The light emitting module is disposed on the light transmissive casing. The light emitting module comprises a frame, a light source and a pattern member. The light source is disposed in the frame. The frame is connected to the light transmissive casing. The pattern member is sandwiched in between the frame and the light transmissive casing. The pattern member has at least one light transmissive pattern region. A light emitted by the light source passes through the at least one light transmissive pattern region to be projected out of the light transmissive casing, so as to form a pattern corresponding to the at least one light transmissive pattern region.

As mentioned in the above, the invention utilizes the light transmissive casing and the light emitting module to cooperate with each other, such that the light emitted by the light source forms a pattern corresponding to the light transmissive pattern region through the pattern member, so as to improve the appearance of the electronic device. Since the structural design is simple, the appearance of the electronic device can be improved without increasing much manufacture cost, so as to increase the desire of purchasing the electronic device of the invention for a consumer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
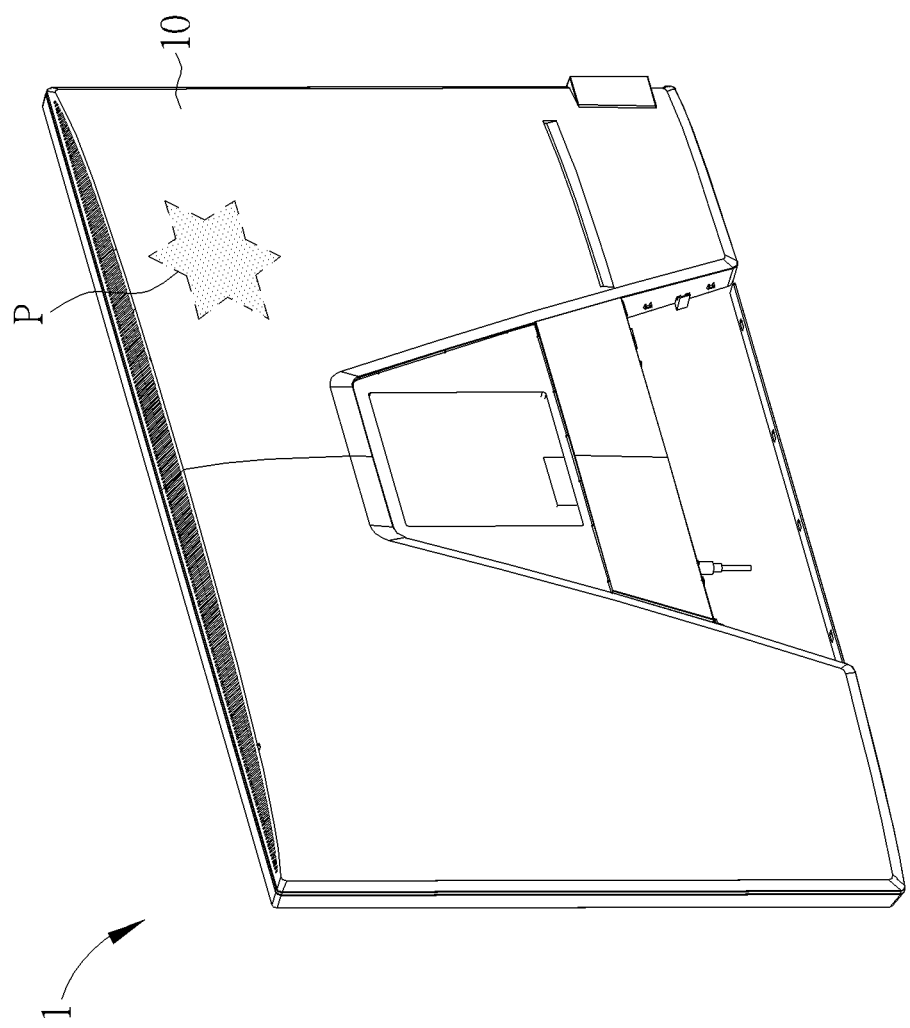
FIG. 1 is a rear perspective view illustrating an electronic device according to an embodiment of the invention.
Figure 2:
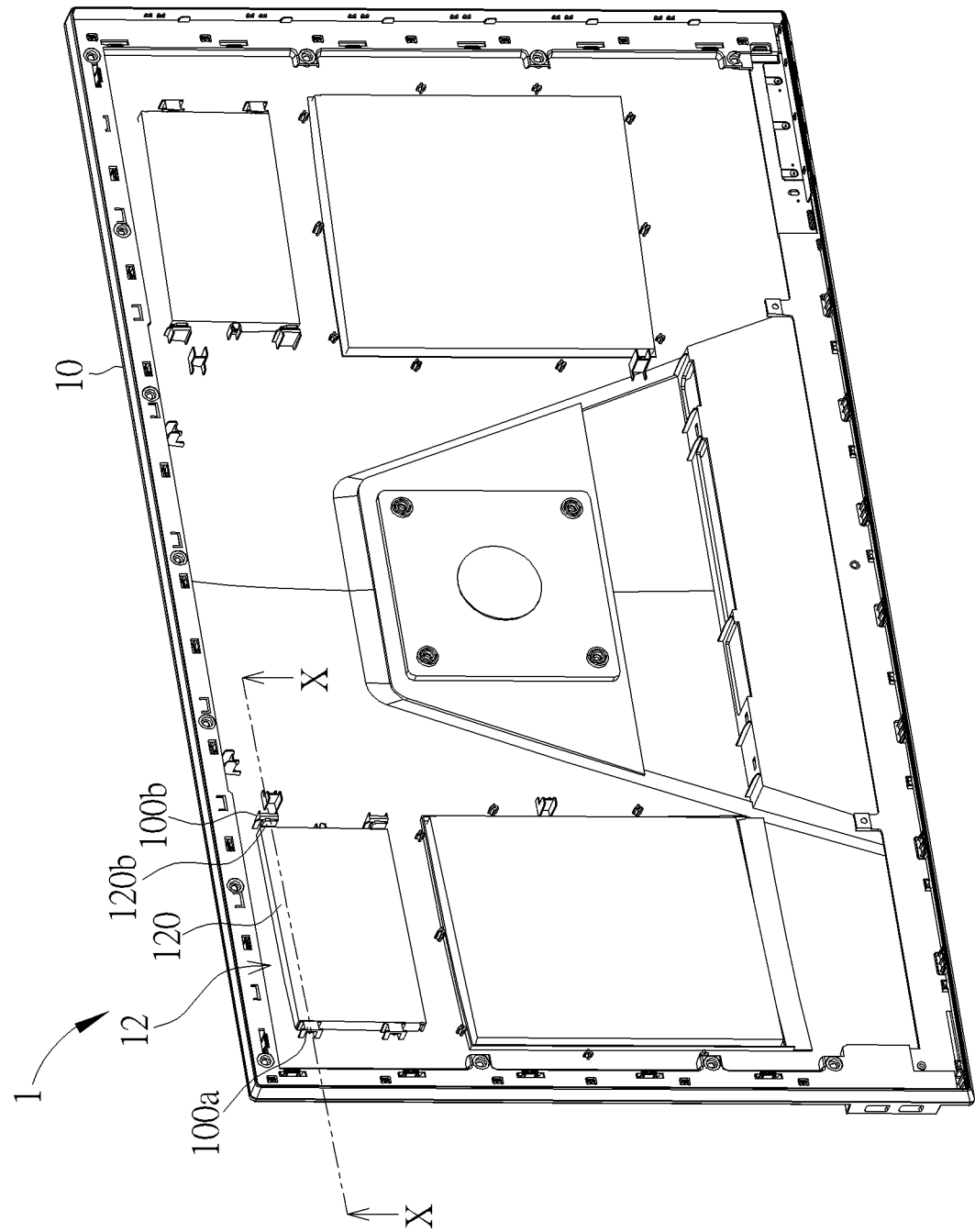
FIG. 2 is a perspective view illustrating the inside of the electronic device shown in FIG. 1 from another viewing angle.
Figure 3:
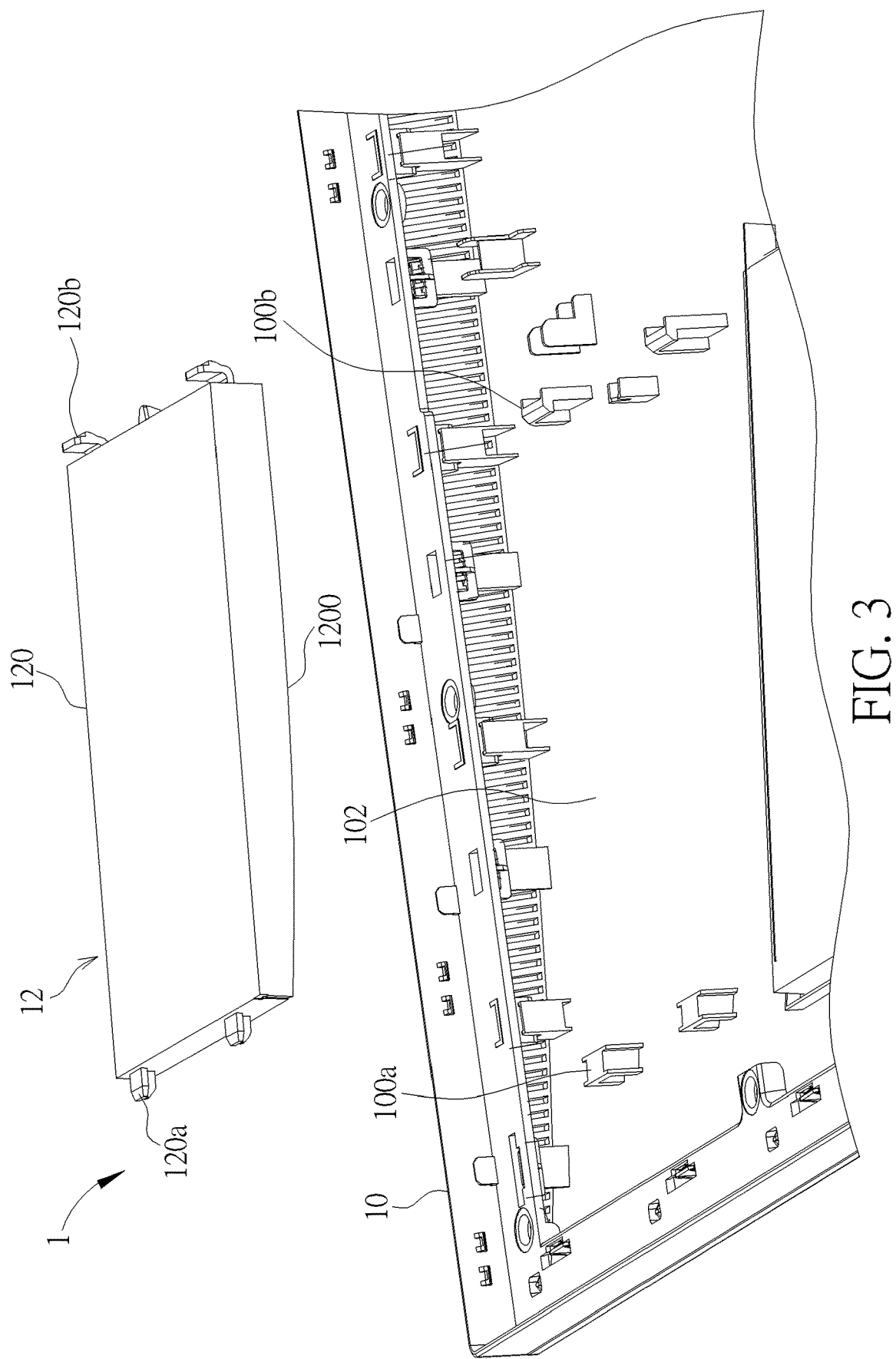
FIG. 3 is an exploded view illustrating the light transmissive casing and the light emitting module shown in FIG. 2.
Figure 4:
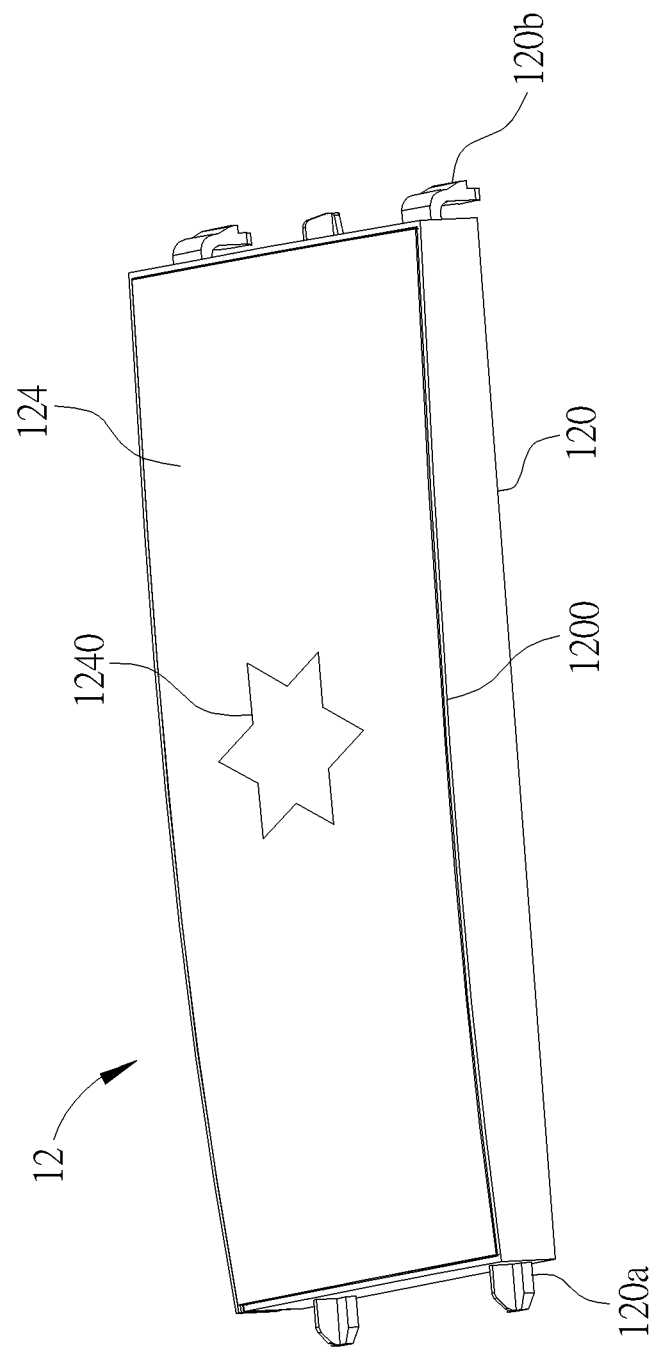
FIG. 4 is a perspective view illustrating the light emitting module shown in FIG. 3 from another viewing angle.
Figure 5:
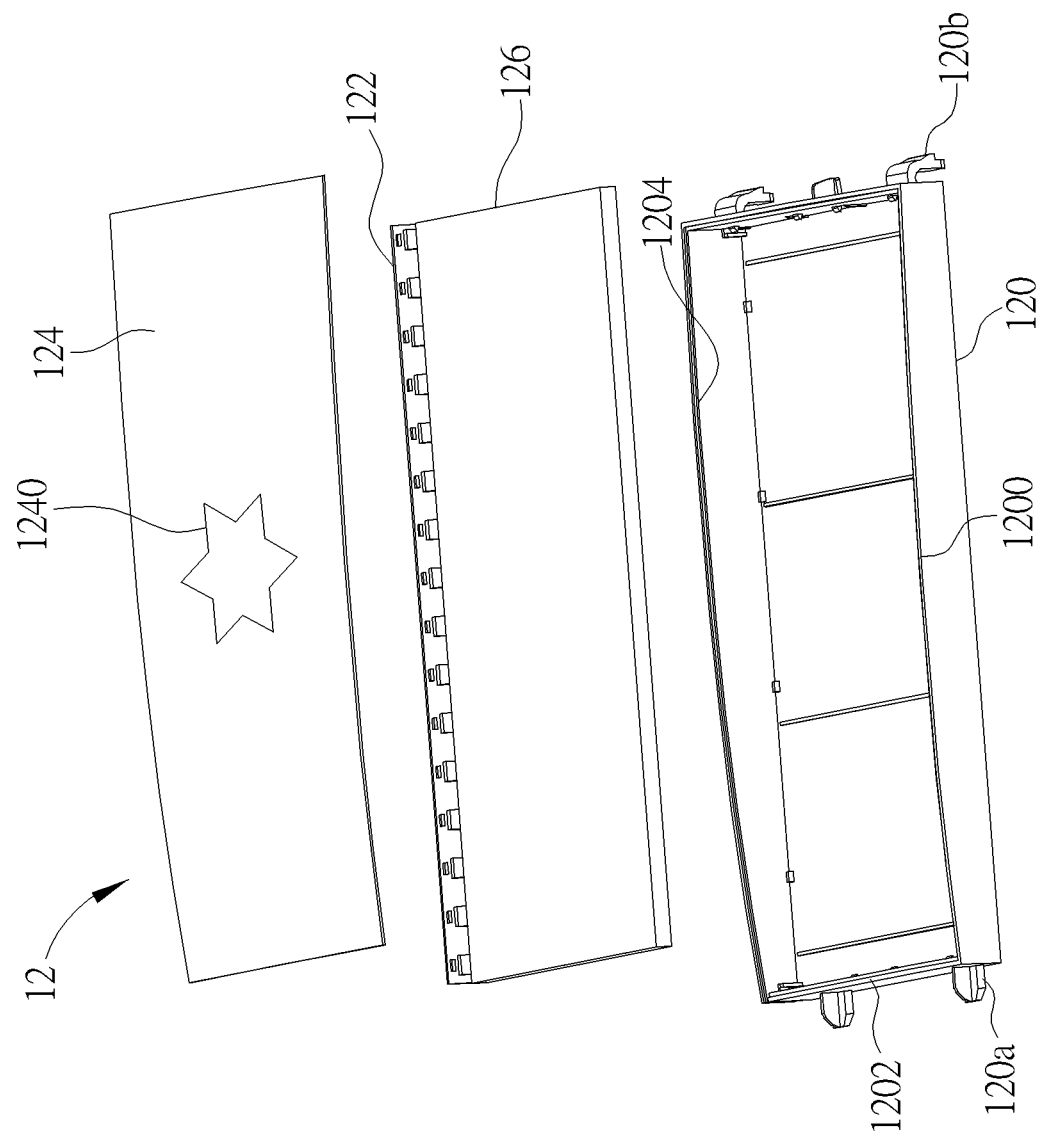
FIG. 5 is an exploded view illustrating the light emitting module shown in FIG. 4.
Figure 6:
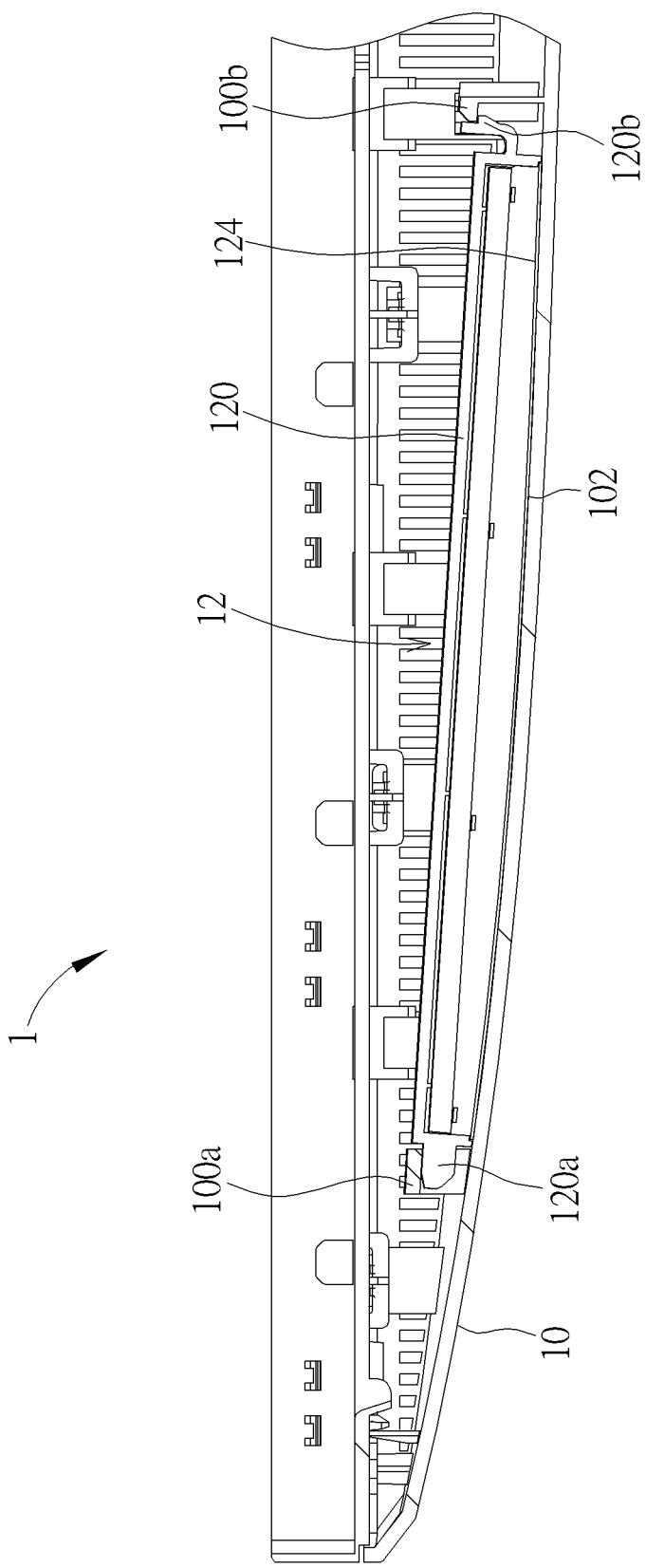
FIG. 6 is a sectional view illustrating the light transmissive casing and the light emitting module along line X-X shown in FIG. 2.

Referring to FIGS. 1 to 6, FIG. 1 is a rear perspective view illustrating an electronic device 1 according to an embodiment of the invention, FIG. 2 is a perspective view illustrating the inside of the electronic device 1 shown in FIG. 1 from another viewing angle, FIG. 3 is an exploded view illustrating the light transmissive casing 10 and the light emitting module 12 shown in FIG. 2, FIG. 4 is a perspective view illustrating the light emitting module 12 shown in FIG. 3 from another viewing angle, FIG. 5 is an exploded view illustrating the light emitting module 12 shown in FIG. 4, and FIG. 6 is a sectional view illustrating the light transmissive casing 10 and the light emitting module 12 along line X-X shown in FIG. 2.

As shown in FIGS. 1 to 6, the electronic device 1 comprises a light transmissive casing 10 and a light emitting module 12. In this embodiment, the electronic device 1 may be, but not limited to, a display device (e.g. liquid crystal display device, plasma display device, organic light emitting diode display device, and so on). In another embodiment, the electronic device 1 may also be other electronic devices equipped with the light transmissive casing 10 and the light emitting module 12.

The light emitting module 12 is disposed on the light transmissive casing 10. As shown in FIG. 5, the light emitting module 12 comprises a frame 120, a light source 122, a pattern member 124 and a light guide plate 126. In this embodiment, the light source 122 may be, but not limited to, a light bar equipped with a plurality of light emitting diodes. In another embodiment, the light source 122 may also be other light emitting devices capable of emitting light. The light source 122 and the light guide plate 126 are disposed in the frame 120, and the light source 122 is located at a side of the light guide plate 126. The light guide plate 126 is configured to guide the light emitted by the light source 122 to the pattern member 124. The pattern member 124 has at least one light transmissive pattern region 1240. In this embodiment, the pattern member 124 may be a flexible transparent film (e.g. mylar) and an opaque material (e.g. black ink or other light absorbing materials) is formed on the transparent file except the light transmissive pattern region 1240. In other words, the light can only pass through the light transmissive pattern region 1240 and cannot pass through the opaque material. Accordingly, after disposing the light emitting module 12 on the light transmissive casing 10, the light emitted by the light source 122 will pass through the light transmissive pattern region 1240 to be projected out of the light transmissive casing 10, so as to form a pattern P (as shown in FIG. 1) corresponding to the light transmissive pattern region 1240.

As shown in FIGS. 2 and 3, the light transmissive casing 10 has a plurality of first engaging portions 100a, 100b and the frame 120 has a plurality of second engaging portions 120a, 120b. The second engaging portions 120a may engage with the first engaging portion 100a and the second engaging portions 120b may engage with the first engaging portion 100b, such that the frame 120 is connected to the light transmissive casing 10. After connecting the frame 120 to the light transmissive casing 10, the pattern member 124 is sandwiched in between the frame 120 and the light transmissive casing 10, as shown in FIG. 6.

In this embodiment, the light transmissive casing 10 may have two first engaging portions 100a and two first engaging portions 100b, wherein the two first engaging portions 100a are opposite to the two first engaging portions 100b. The first engaging portions 100a may be holes and the first engaging portions 100b may be engaging grooves. Furthermore, the frame 120 may have two second engaging portions 120a and two second engaging portions 120b, wherein the two second engaging portions 120a and the two second engaging portions 120b are located at opposite sides of the frame 120. The two second engaging portions 120a correspond to the two first engaging portions 100a and the two second engaging portions 120b correspond to the two first engaging portions 100b. The second engaging portions 120a may be protruding pillars and the second engaging portions 120b may be engaging hooks. To assemble the frame 120 with the light transmissive casing 10, the second engaging portions 120a of the frame 120 may be inserted into the first engaging portions 100a of the light transmissive casing 10 first and then the frame 120 is pressed down toward the light transmissive casing 10, such that the second engaging portions 120b of the frame 120 are engaged with the first engaging portions 100b of the light transmissive casing 10. Accordingly, the frame 120 can be connected to the light transmissive casing 10 easily.

Furthermore, a user only needs to separate the second engaging portions 120b of the frame from the first engaging portions 100b of the light transmissive casing 10 and then the frame 120 can be detached from the light transmissive casing 10 easily, so as to replace the pattern member 124 with different patterns. Accordingly, the user can utilize the light emitting module 12 to project different patterns out of the light transmissive casing 10.

In this embodiment, the light transmissive casing 10 may have a first curved connecting surface 102 and the frame 120 may have a second curved connecting surface 1200. Accordingly, when the frame 120 is connected to the light transmissive casing 10, the pattern member 124 is sandwiched in between the first curved connecting surface 120 and the second curved connecting surface 1200. Since the pattern member 124 is flexible, the pattern member 124 will deform due to compression between the frame 120 and the light transmissive casing 10, such the pattern member 124 will perfectly fit the first curved connecting surface 102 of the light transmissive casing 10, so as to enhance clarity of the pattern P shown in FIG. 1.

Furthermore, as shown in FIG. 5, the frame 120 may have a restraining structure 1202 and a curved restraining surface 1204, wherein the curved restraining surface 1204 is lower than the second curved connecting surface 1200. When the pattern member 124 is disposed on the frame 120, the pattern member 124 abuts against the restraining structure 1202 and the curved restraining surface 1204, such that the pattern member 124 is restrained on the frame 120.

Figure 7:
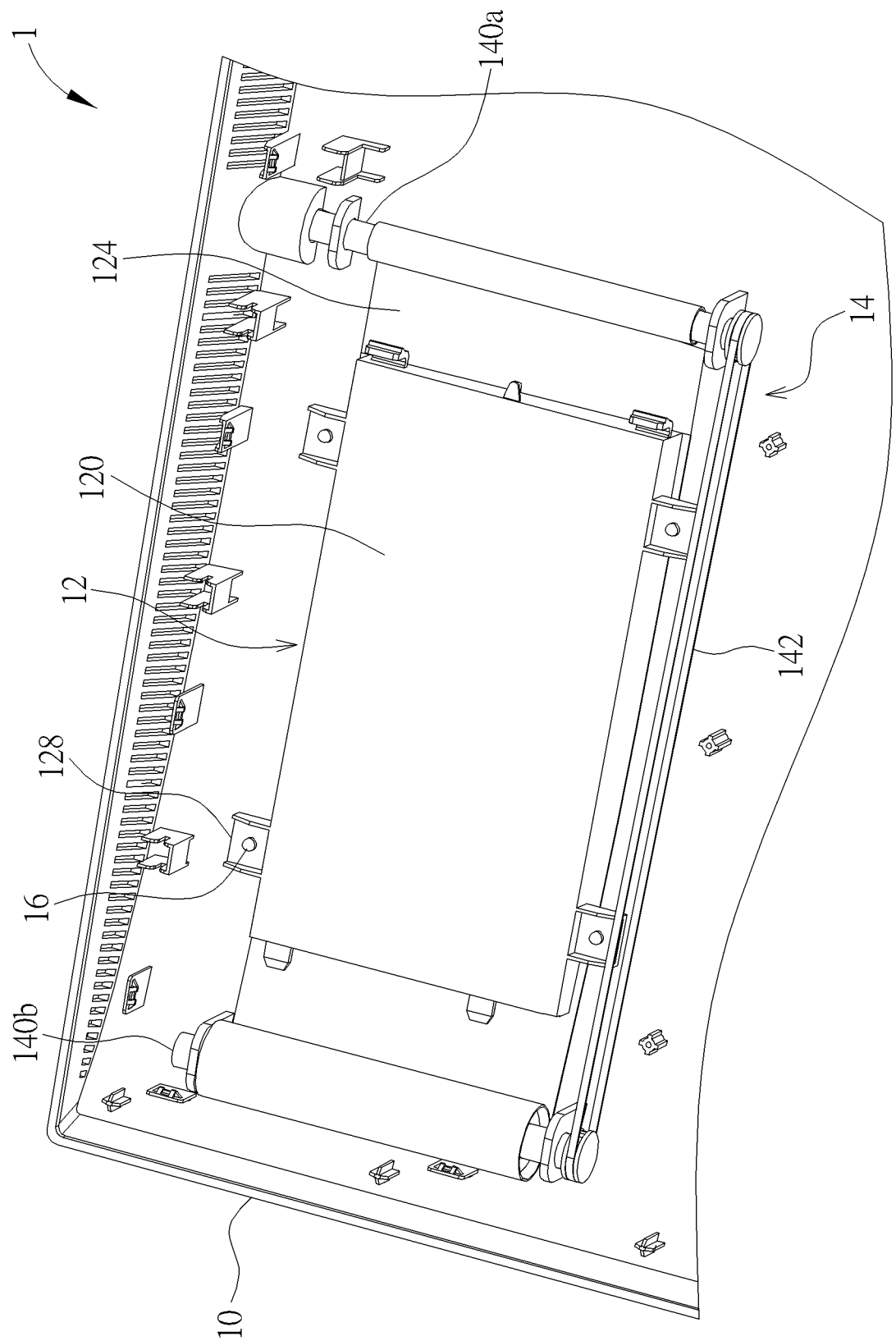
FIG. 7 is a perspective view illustrating the light transmissive casing and the light emitting module according to another embodiment of the invention.
Figure 8:
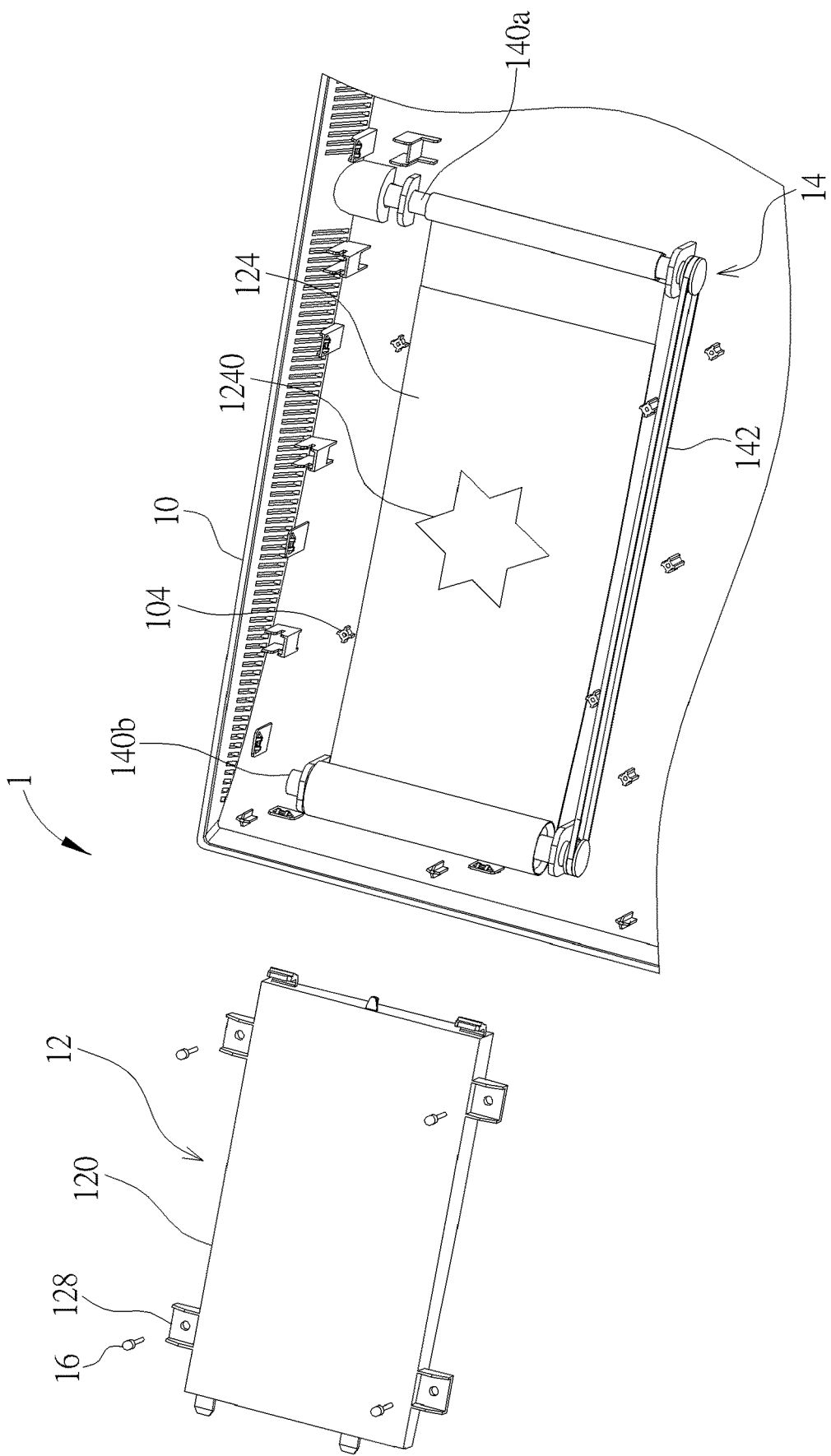
FIG. 8 is an exploded view illustrating the light transmissive casing and the light emitting module shown in FIG. 7.
Figure 9:
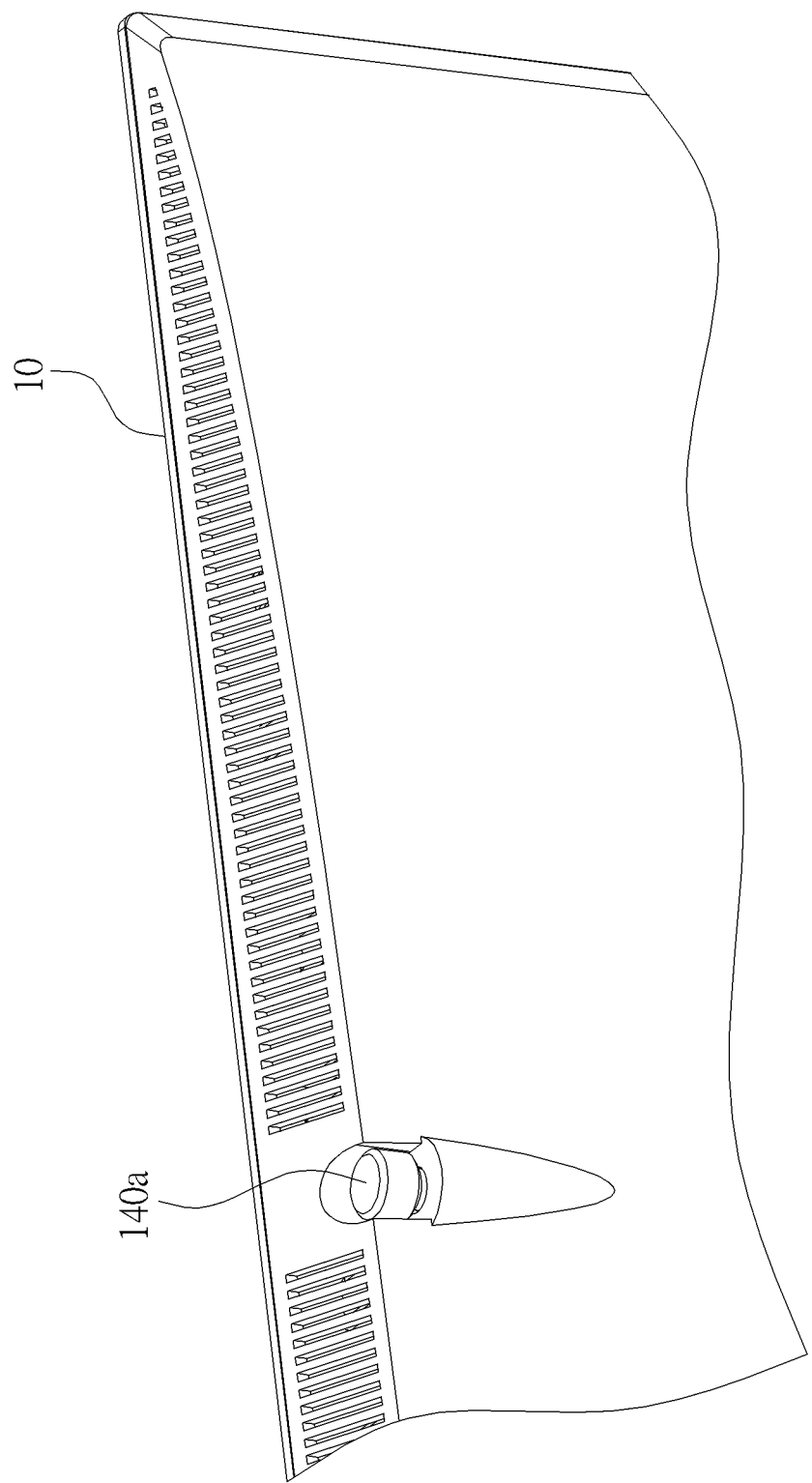
FIG. 9 is a perspective view illustrating the light transmissive casing shown in FIG. 7 from another viewing angle.

Referring to FIGS. 7 to 9, FIG. 7 is a perspective view illustrating the light transmissive casing 10 and the light emitting module 12 according to another embodiment of the invention, FIG. 8 is an exploded view illustrating the light transmissive casing 10 and the light emitting module 12 shown in FIG. 7, and FIG. 9 is a perspective view illustrating the light transmissive casing 10 shown in FIG. 7 from another viewing angle.

As shown in FIGS. 7 and 8, the electronic device 1 of the invention may further comprise a driving unit 14 connected to the pattern member 124. In this embodiment, the driving unit 14 may comprise two rotating shafts 140a, 140b and a belt 142. The pattern member 124 may wind around the two rotating shafts 140a, 140b and the belt 142 is connected to the two rotating shafts 140a, 140b. As shown in FIG. 9, an end of the rotating shaft 140a is exposed from the light transmissive casing 10. The invention may form a plurality of light transmissive pattern regions 1240 on the pattern member 124. A user may rotate the rotating shaft 140 manually, such that the belt 142 drives the rotating shaft 140b to rotate. At this time, the pattern member 124 rotates with respect to the frame 120, such that the light emitted by the light source 122 (as shown in FIG. 5) passes through one of the light transmissive pattern regions 1240 to be projected out of the light transmissive casing 10. In other words, the user may operate the driving unit 14 to drive the pattern member 124 to rotate with respect to the frame 120, so as to utilize the light emitting module 12 to project different patterns out of the light transmissive casing 10.

In this embodiment, the light transmissive casing 10 may have a plurality of first fixing portions 104, the frame 120 may have a plurality of second fixing portions 128, and the electronic device 1 may further comprise a plurality of fixing members 16 (e.g. screws). The fixing members 16 are configured to fix the second fixing portions 128 to the first fixing portions 104, such that the frame 120 is connected to the light transmissive casing 10. In this embodiment, an area of the pattern member 124 is larger than or equal to an area of an opening of the frame 120. Accordingly, when the frame 120 is connected to the light transmissive casing 10, the pattern member 124 may cover the opening of the frame 120 wholly, so as to prevent the light from leaking out of the gap between the frame 120 and the light transmissive casing 10.

Figure 10:
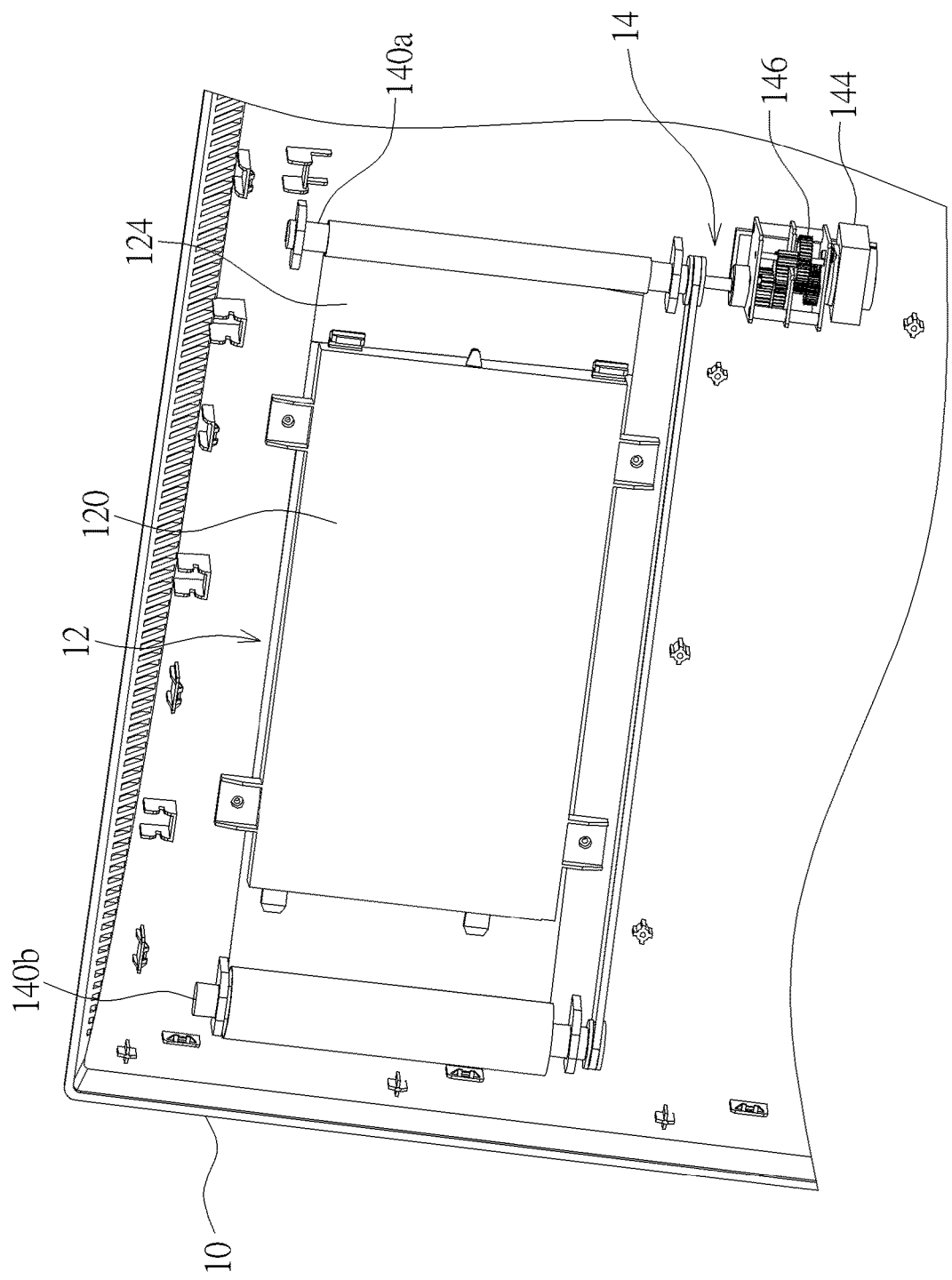
FIG. 10 is a perspective view illustrating the light transmissive casing and the light emitting module according to another embodiment of the invention.

Referring to FIG. 10, FIG. 10 is a perspective view illustrating the light transmissive casing 10 and the light emitting module 12 according to another embodiment of the invention. As shown in FIG. 10, the driving unit 14 may further comprise a motor 144 and a gear set 146, wherein the gear set 146 is connected to the rotating shaft 140a and the motor 144 is connected to the gear set 146. When the motor 144 is operating, the gear set 146 drives the rotating shaft 140a to rotate, such that the belt 142 drives the rotating shaft 140b to rotate. At this time, the pattern member 124 rotates with respect to the frame 120, such that the light emitted by the light source 122 (as shown in FIG. 5) passes through one of the light transmissive pattern regions 1240 to be projected out of the light transmissive casing 10. In this embodiment, a button (not shown) may be disposed on the electronic device. When a user presses the button, the motor 144 is actuated to rotate the pattern member 124. Accordingly, the rotating shaft 140a does not need to be exposed from the light transmissive casing 10.

Figure 11:
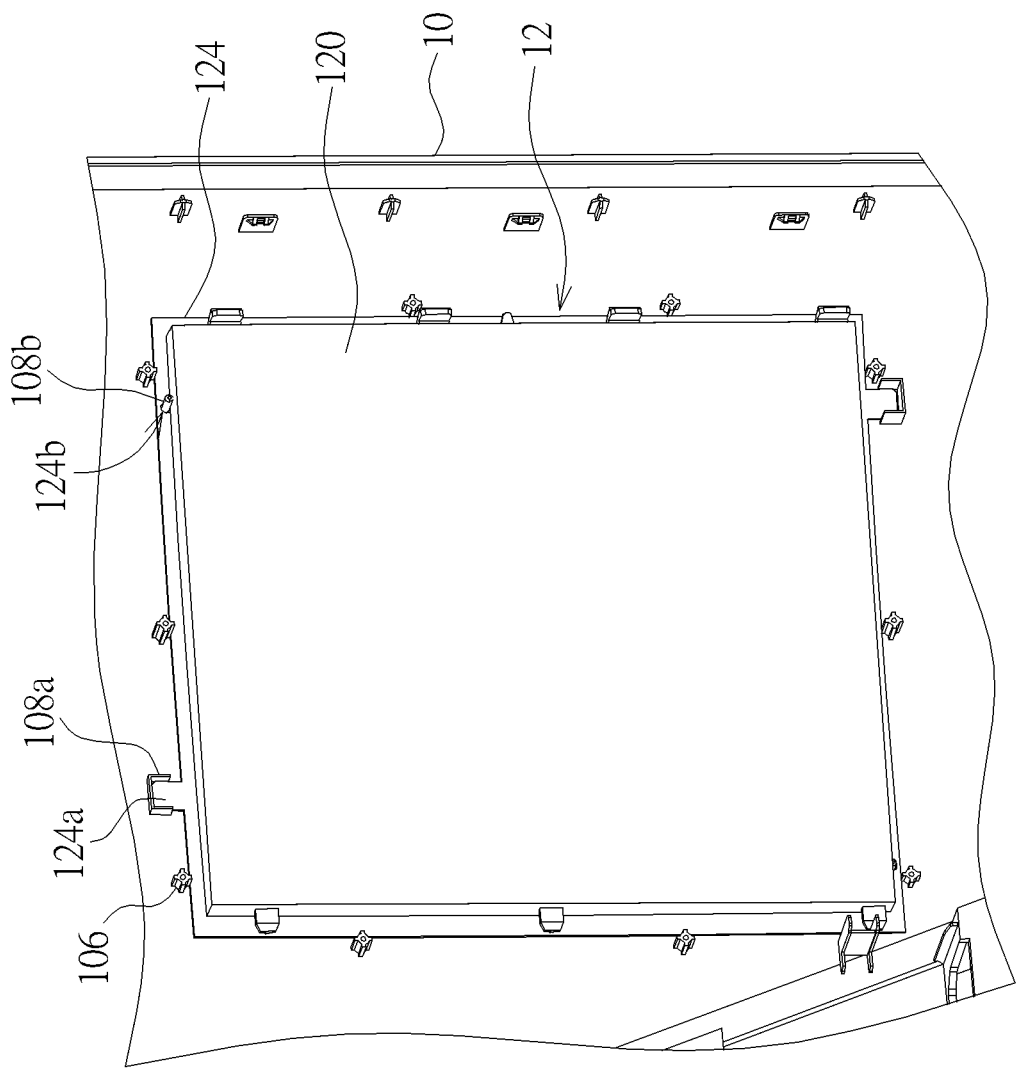
FIG. 11 is a perspective view illustrating the light transmissive casing and the light emitting module according to another embodiment of the invention.

Referring to FIG. 11, FIG. 11 is a perspective view illustrating the light transmissive casing 10 and the light emitting module 12 according to another embodiment of the invention. As shown in FIG. 11, the light transmissive casing 10 may have a restraining structure 106. When the light emitting module 12 is disposed on the light transmissive casing 10, the pattern member 124 abuts against the restraining structure 106, such that the pattern member 124 is restrained between the light transmissive casing 10 and the frame 120. Furthermore, the light transmissive casing 10 may have a first positioning structure 108a and the pattern member 124 may have a second positioning structure 124a. The first positioning structure 108a may be a rib and the second positioning structure 124a may be a protruding ear. When the light emitting module 12 is disposed on the light transmissive casing 10, the first positioning structure 108a may cooperate with the second positioning structure 124a to position the pattern member 124. Still further, the light transmissive casing 10 may have a first positioning structure 108b and the pattern member 124 may have a second positioning structure 124b. The first positioning structure 108b may be a protruding pillar and the second positioning structure 124b may be a hole. When the light emitting module 12 is disposed on the light transmissive casing 10, the first positioning structure 108b may also cooperate with the second positioning structure 124b to position the pattern member 124. It should be noted that the number of the restraining structure 106, the first positioning structures 108a, 108b and the second positioning structures 124a, 124b may be determined according to practical applications, so the invention is not limited to the embodiment shown in the figure.

Figure 12:
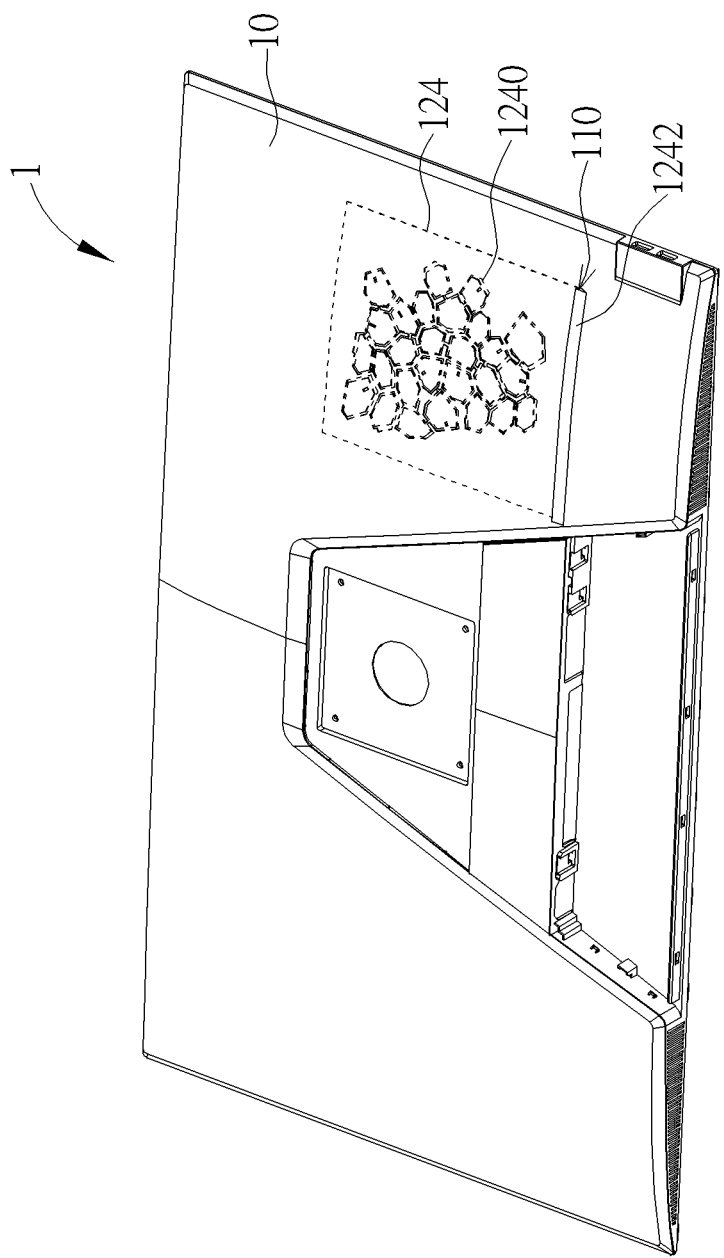
FIG. 12 is a perspective view illustrating the light transmissive casing according to another embodiment of the invention.
Figure 13:
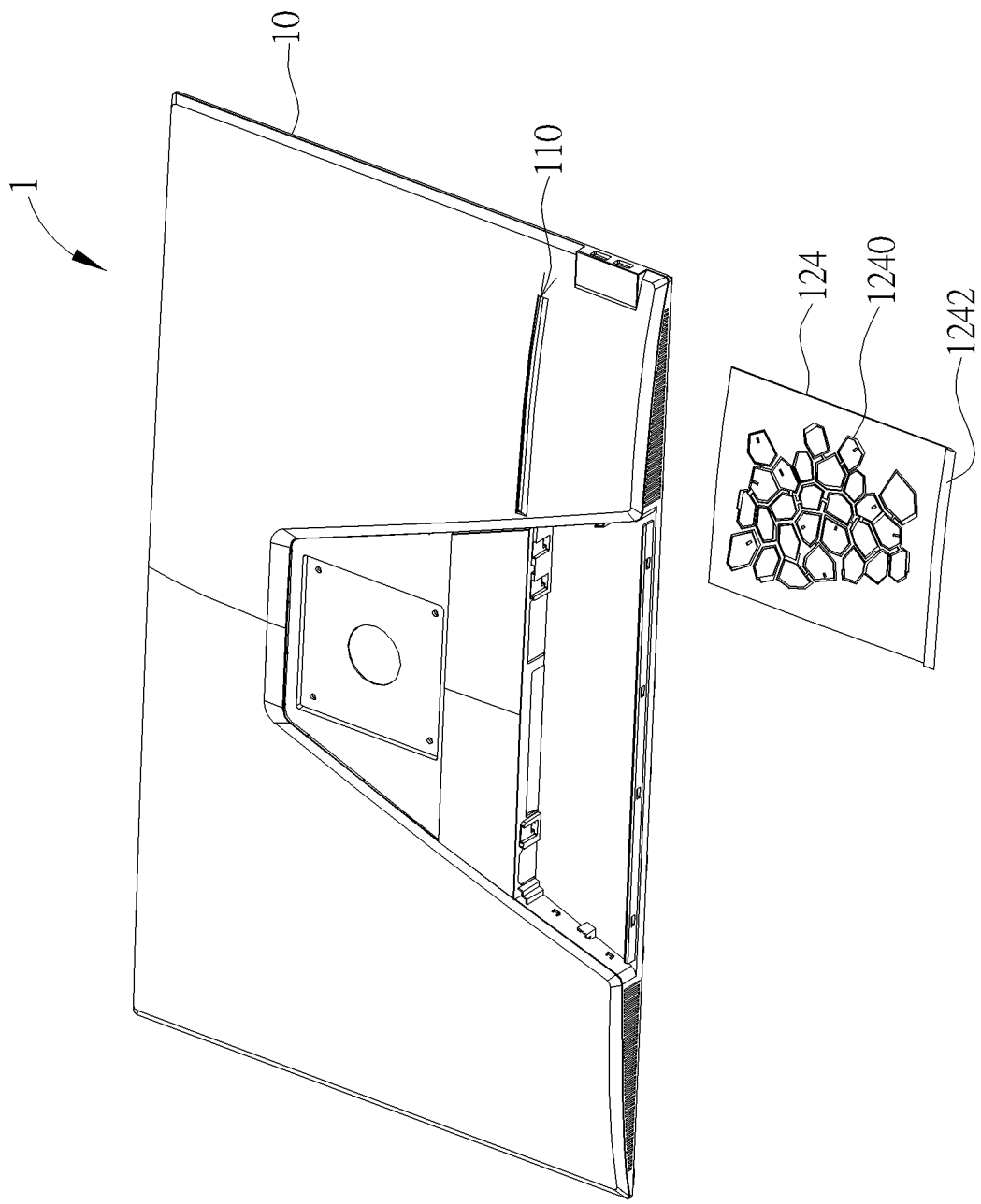
FIG. 13 is a perspective view illustrating the pattern member shown in FIG. 12 being removed from the opening of the light transmissive casing.
Figure 14:
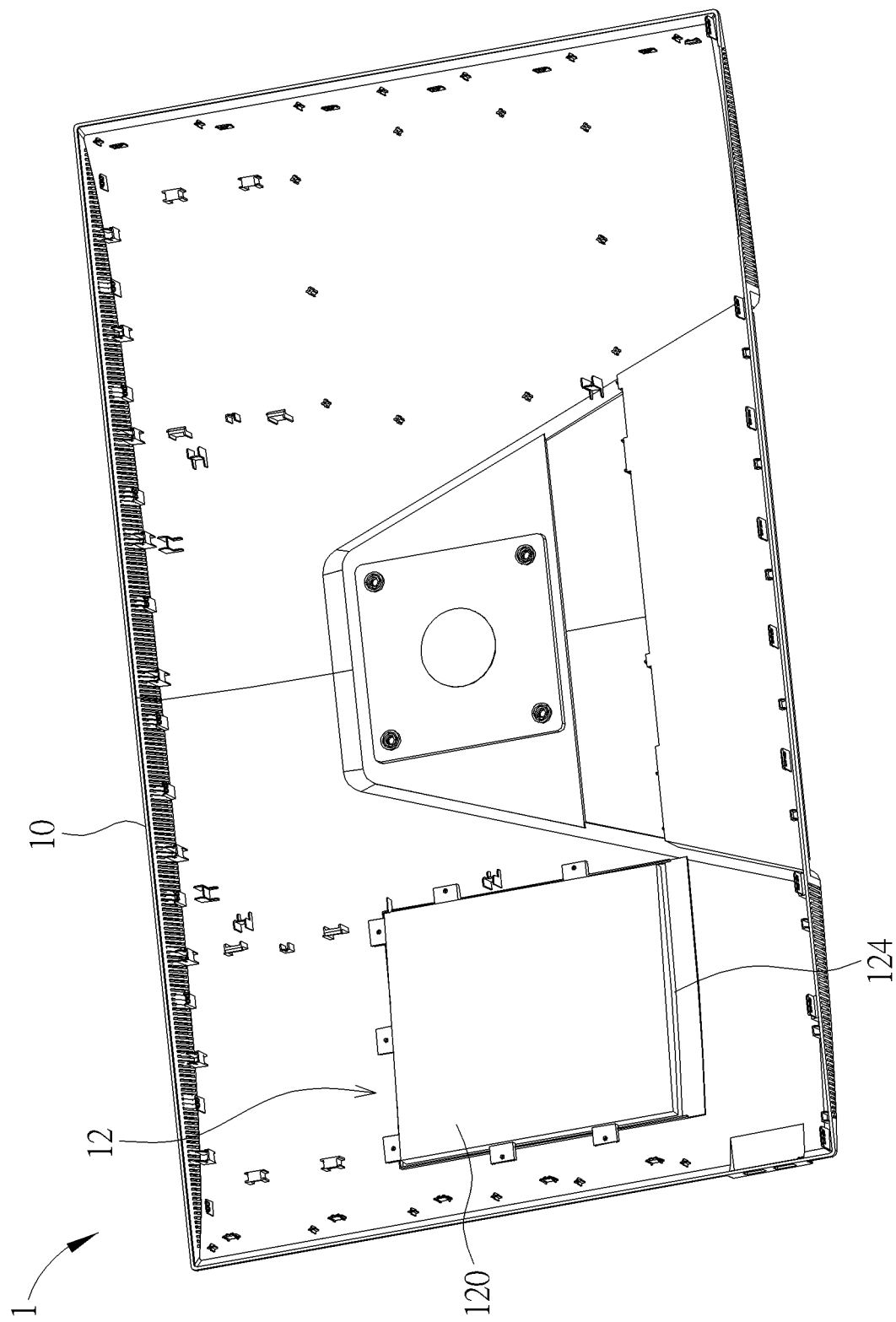
FIG. 14 is a perspective view illustrating the light transmissive casing shown in FIG. 12 from another viewing angle.
Figure 15:
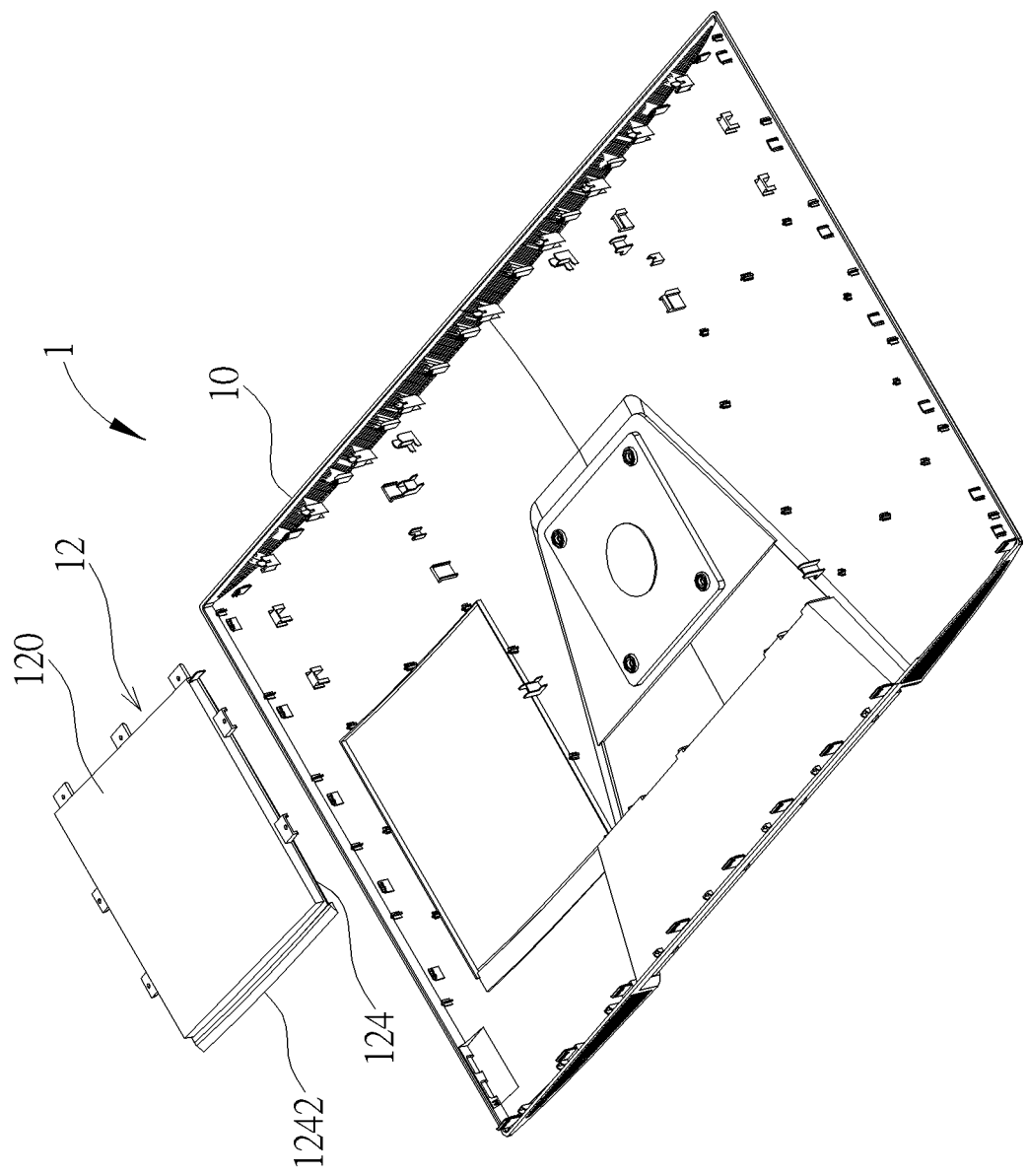
FIG. 15 is an exploded view illustrating the light transmissive casing and the light emitting module shown in FIG. 14.
Figure 16:
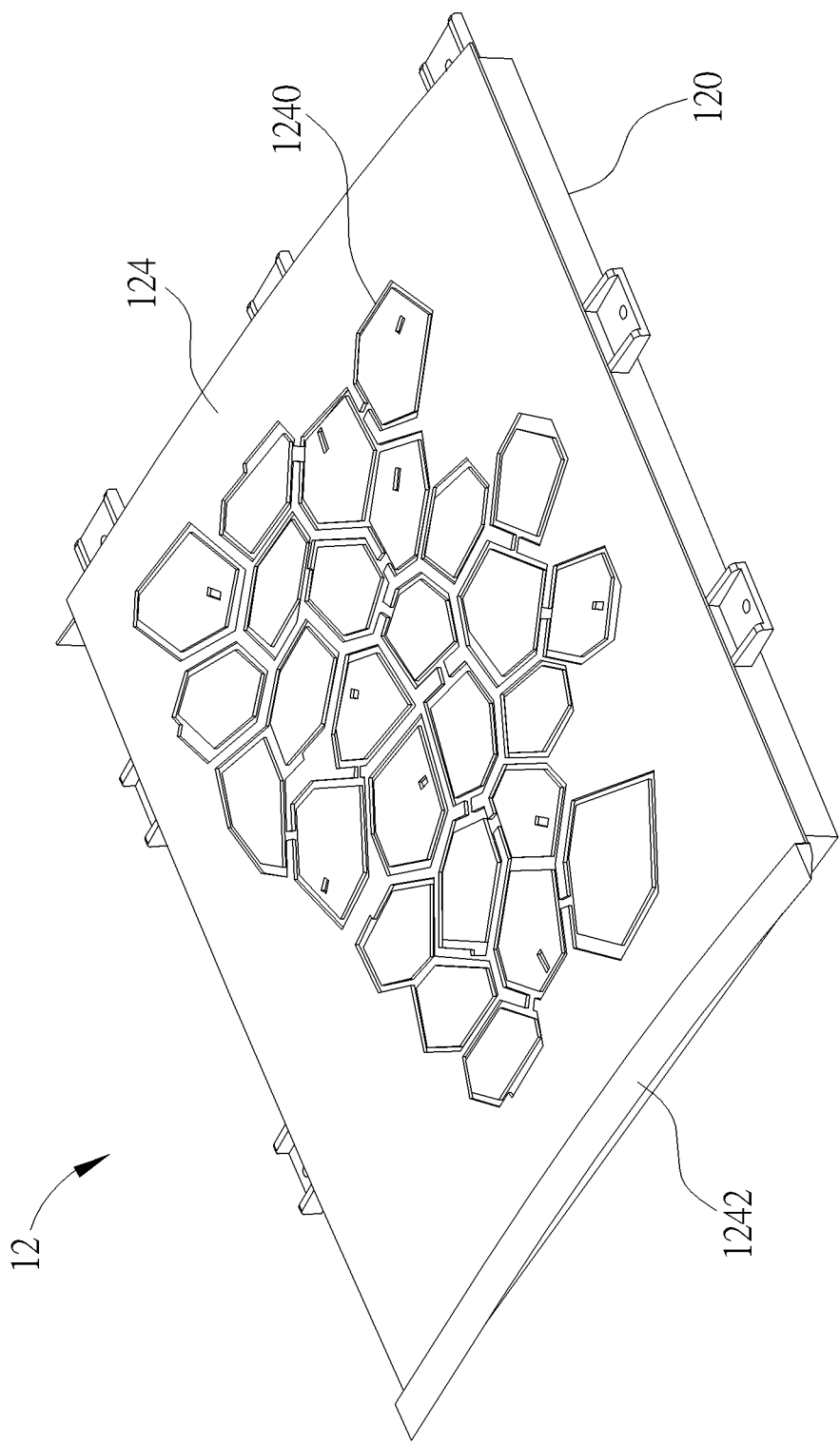
FIG. 16 is a perspective view illustrating the light emitting module shown in FIG. 15 from another viewing angle.

Referring to FIGS. 12 to 16, FIG. 12 is a perspective view illustrating the light transmissive casing 10 according to another embodiment of the invention, FIG. 13 is a perspective view illustrating the pattern member 124 shown in FIG. 12 being removed from the opening 110 of the light transmissive casing 10, FIG. 14 is a perspective view illustrating the light transmissive casing 10 shown in FIG. 12 from another viewing angle, FIG. 15 is an exploded view illustrating the light transmissive casing 10 and the light emitting module 12 shown in FIG. 14, and FIG. 16 is a perspective view illustrating the light emitting module 12 shown in FIG. 15 from another viewing angle.

As shown in FIGS. 12 to 16, the light transmissive casing 10 may have an opening 110 and the pattern member 124 may have a holding end 1242. When the pattern member 124 is sandwiched in between the frame 120 and the light transmissive casing 10 (as shown in FIG. 14), the holding end 1242 of the pattern member 124 is located in the opening 110 of the light transmissive casing 10 (as shown in FIG. 12). In this embodiment, a shape of the holding end 1242 of the pattern member 124 corresponds to a shape of the opening 110 of the light transmissive casing 10. Accordingly, when the holding end 1242 of the pattern member 124 is located in the opening 110 of the light transmissive casing 10, the holding end 1242 covers the opening 110. As shown in FIGS. 12 and 13, the pattern member 124 may be inserted into or removed from the light transmissive casing 10 through the opening 110 and the holding end 1242, so as to replace the pattern member 124 with different patterns.

As mentioned in the above, the invention utilizes the light transmissive casing and the light emitting module to cooperate with each other, such that the light emitted by the light source forms a pattern corresponding to the light transmissive pattern region through the pattern member, so as to improve the appearance of the electronic device. Since the structural design is simple, the appearance of the electronic device can be improved without increasing much manufacture cost, so as to increase the desire of purchasing the electronic device of the invention for a consumer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising: a light transmissive casing; and a light emitting module disposed on the light transmissive casing, the light emitting module comprising a frame, a light source and a pattern member, the light source being disposed in the frame, the frame being connected to the light transmissive casing, the pattern member being sandwiched in between the frame and the light transmissive casing, the pattern member having an area larger than and protruding outside of an area of an opening of the frame and having at least one light transmissive pattern region disposed within the opening of the frame, a light emitted by the light source passing through the at least one light transmissive pattern region to be projected out of the light transmissive casing, so as to form a pattern corresponding to the at least one light transmissive pattern region.

2. The electronic device of claim 1, wherein the pattern member is flexible.

3. The electronic device of claim 1, wherein the light transmissive casing has a plurality of first engaging portions, the frame has a plurality of second engaging portions, and the second engaging portions engage with the first engaging portions, such that the frame is connected to the light transmissive casing.

4. The electronic device of claim 1, wherein the light transmissive casing has a plurality of first fixing portions, the frame has a plurality of second fixing portions, the electronic device further comprises a plurality of fixing members, and the fixing members fix the second fixing portions to the first fixing portions, such that the frame is connected to the light transmissive casing.

5. The electronic device of claim 1, wherein the light transmissive casing has a first positioning structure, the pattern member has a second positioning structure, and the first positioning structure cooperates with the second positioning structure to position the pattern member.

6. The electronic device of claim 1, wherein at least one of the light transmissive casing and the frame has a restraining structure and the pattern member abuts against the restraining structure.

7. The electronic device of claim 1, wherein the light transmissive casing has a first curved connecting surface, the frame has a second curved connecting surface, and the pattern member is sandwiched in between the first curved connecting surface and the second curved connecting surface when the frame is connected to the light transmissive casing.

8. The electronic device of claim 7, wherein the frame has a curved restraining surface, the curved restraining surface is lower than the second curved connecting surface, and the pattern member abuts against the curved restraining surface.

9. The electronic device of claim 1, further comprising a driving unit connected to the pattern member, the driving unit driving the pattern member to rotate with respect to the frame, such that the light emitted by the light source passes through one of the at least one light transmissive pattern region to be projected out of the light transmissive casing.

10. The electronic device of claim 1, wherein the light transmissive casing has an opening, the pattern member has a holding end, the pattern member is inserted into or removed from the light transmissive casing through the opening and the holding end, and the holding end of the pattern member is located in the opening when the pattern member is sandwiched in between the frame and the light transmissive casing.

11. The electronic device of claim 10, wherein a shape of the holding end corresponds to a shape of the opening and the holding end covers the opening when the holding end is located in the opening.

\* \* \* \* \*